US006022223A

United States Patent [19]

Taniguchi et al.

[11] Patent Number: 6,022,223

[45] Date of Patent: Feb. 8, 2000

[54] VIDEO/AUDIO DATA SUPPLYING DEVICE

[75] Inventors: Toshinori Taniguchi, Gifu-ken; Takamitsu Suzuki, Nagoya, both of Japan

[73] Assignees: Brother Kogyo Kabushiki Kaisha; Xing, Inc., both of Japan

[21] Appl. No.: 08/742,833

[22] Filed: Oct. 31, 1996

[30] Foreign Application Priority Data

Oct. 31, 1995 [JP] Japan .................................... 7-283426

[51] Int. Cl.[7] ............................... A63H 1/28; G09B 5/08; G10H 1/26

[52] U.S. Cl. .................................. 434/307 A; 434/307 R; 84/609; 348/10; 455/4.2; 370/437

[58] Field of Search ................................ 434/307 R–309, 434/318, 365; 84/609, 610, 634, 477 R; 340/825.08, 825.07, 825.2; 455/4.2, 6.3, 5.1; 348/7, 6, 10, 12, 13, 390, 423, 408, 403, 845; 369/32, 275.3, 59.47; 360/48, 72.2, 72.1; 709/203, 219, 227, 238, 236; 705/17, 39; 370/449, 536, 229, 437, 432, 474, 537; 380/20; 708/203; 345/435

[56] References Cited

U.S. PATENT DOCUMENTS

| | | | |
|---|---|---|---|
| 5,027,400 | 6/1991 | Baji et al. | 380/20 |
| 5,548,281 | 8/1996 | Funahashi et al. | 340/825.08 |
| 5,548,696 | 8/1996 | Kubota et al. | 345/435 |
| 5,588,842 | 12/1996 | Nishimura et al. | 434/307 A |
| 5,613,192 | 3/1997 | Ikami et al. | 455/4.2 |
| 5,619,425 | 4/1997 | Funahashi et al. | 434/307 A |
| 5,623,424 | 4/1997 | Azadegan et al. | 708/203 |
| 5,671,226 | 9/1997 | Murakami et al. | 370/474 |
| 5,675,509 | 10/1997 | Ikami et al. | 370/449 X |
| 5,684,843 | 11/1997 | Furukawa et al. | 370/449 X |
| 5,691,777 | 11/1997 | Kassatly | 348/408 |
| 5,691,915 | 11/1997 | Funahashi et al. | 348/10 X |
| 5,725,383 | 3/1998 | Funahashi et al. | 434/307 A |
| 5,726,373 | 3/1998 | Choi et al. | 84/609 |
| 5,742,569 | 4/1998 | Yamamoto et al. | 369/32 |
| 5,753,844 | 5/1998 | Matsumoto | 84/609 |
| 5,757,752 | 5/1998 | Sako | 369/59 |
| 5,774,672 | 6/1998 | Funahashi et al. | 84/609 X |
| 5,810,603 | 9/1998 | Kato et al. | 434/307 A |
| 5,841,472 | 11/1998 | Rim et al. | 348/390 |

*Primary Examiner*—Joe H. Cheng
*Attorney, Agent, or Firm*—Oliff & Berridge, PLC

[57] ABSTRACT

When the input output controller 22 receives request data through the modem 42, the input output controller 22 controls the memory controller 25 to retrieve an AV stream and a BGV stream from the memories and to transfer the streams to the multiplexer 30. The memory controller 25 retrieves a BGV stream from the BGV memories **26*a*, 26*b*, and 26*c* and an AV stream from the AV memories 27*a*, 27*b*, and 27*c*. When receiving the BGV stream and the AV stream, the multiplexer 30 divides the AV stream into a lyric stream and a music stream. The multiplexer 30 composes the lyric stream and the BGV stream into a video stream. The multiplexer 30** time-divisionally multiplexes the video stream and the music stream and outputs the multiplexed stream as a video/music stream.

17 Claims, 7 Drawing Sheets

VIDEO/AUDIO DATA SUPPLYING DEVICE

BACKGROUND OF THE INVENTION

1. Field of the Invention

The present invention relates to a video/audio data supplying device such as a video server and a media server.

2. Description of the Related Art

In a conventional video/audio data supplying device such as a video server, video data and audio data are encoded together into video/audio data. Thus united data (system stream data) is stored in a memory device such as a hard disk. When requested from a user's terminal, the video/audio data supplying device retrieves the system stream data from the memory device and then transmits the system stream data to the user's terminal.

It is noted that when the video data and the audio data are encoded together into video/audio data, the video data and the audio data are composed or multiplexed into the system stream data according to a MPEG format so that the video data and the audio data are in synchronization with each other.

SUMMARY OF THE INVENTION

It is conceivable to encode and store karaoke software data as system stream data in the above-described video/audio data supplying device.

In order to achieve a karaoke performance, a karaoke lyric image is superimposed on a background image (moving picture). A karaoke music sound (accompaniment music sound) is played in synchronization with the karaoke lyric image.

It is now assumed that the video/audio data supplying device has to supply 10,000 songs' worth of karaoke data. In order to satisfy this demand, 10,000 songs' worth of lyric video data, 10,000 songs' worth of music data, and 10,000 songs' worth of background video data have to be encoded together into 10,000 songs' of video/audio data. Thus produced 10,000 songs' worth of system stream data are stored in the memory device. If each song is three minutes long, the total length of the video/audio data becomes as long as 30,000 minutes. The total amount of the MPEG-encoded video data becomes as much as several tens giga-bytes. It takes a long time to encode all the data. The memory device has to have a large storage area. The video/audio data supplying device becomes highly expensive.

The above-described problem is not limited to the case where karaoke software data is stored, but common to all the cases where video/audio data and another video data are composed into a system stream data and stored as a system stream data in a video/audio data supplying device.

It is therefore, an object of the present invention to overcome the above-described drawbacks, and to provide an improved video/audio data supplying device which can store a small amount of video data but which can supply a large variety of video data and which is still inexpensive.

In order to attain the above object and other objects, the present invention provides a video/audio data supplying device for supplying video data and audio data, the device comprising: data memory means for storing video/audio data, comprised of video data and audio data, and additional video data separately from the video/audio data; data retrieving means for retrieving the video/audio data and the additional video data from the data memory means; data composing means for composing the retrieved video/audio data and the additional video data into a single composite video/audio data; and output means for outputting the composite video/audio data.

The output means may transmit the composite video/audio data to an output terminal. The video/audio data may be comprised of lyric video data and music data for a karaoke song.

The memory means may store a plurality of sets of video/audio data and a plurality of sets of additional video data for several genres, to which the plurality of sets of video/audio data are classified, each set of additional video data of each genre being comprised of video data to be combined with video/audio data of the genre. The video/audio data supplying device may further comprise control means for controlling the retrieving means to select a desired set of video/audio data and to select a set of additional video data of a genre to which a desired video/audio data set belongs, the data composing means composing the selected video/audio data and the selected additional video data into a single composite video/audio data. The control means may receive a request, from an output terminal, to transmit a desired composite video/audio data to the output terminal, the control means controlling the retrieving means to select a set of video/audio data for the requested data and to select a set of additional video data of a genre to which the requested data belongs.

BRIEF DESCRIPTION OF THE DRAWINGS

The above and other objects, features and advantages of the invention will become more apparent from reading the following description of the preferred embodiment taken in connection with the accompanying drawings in which:

FIG. 7(*b*) illustrates how a background image and a lyric image are displayed in the entire display region of the video/audio data output device.

DETAILED DESCRIPTION OF THE PREFERRED EMBODIMENT

Figure 1:
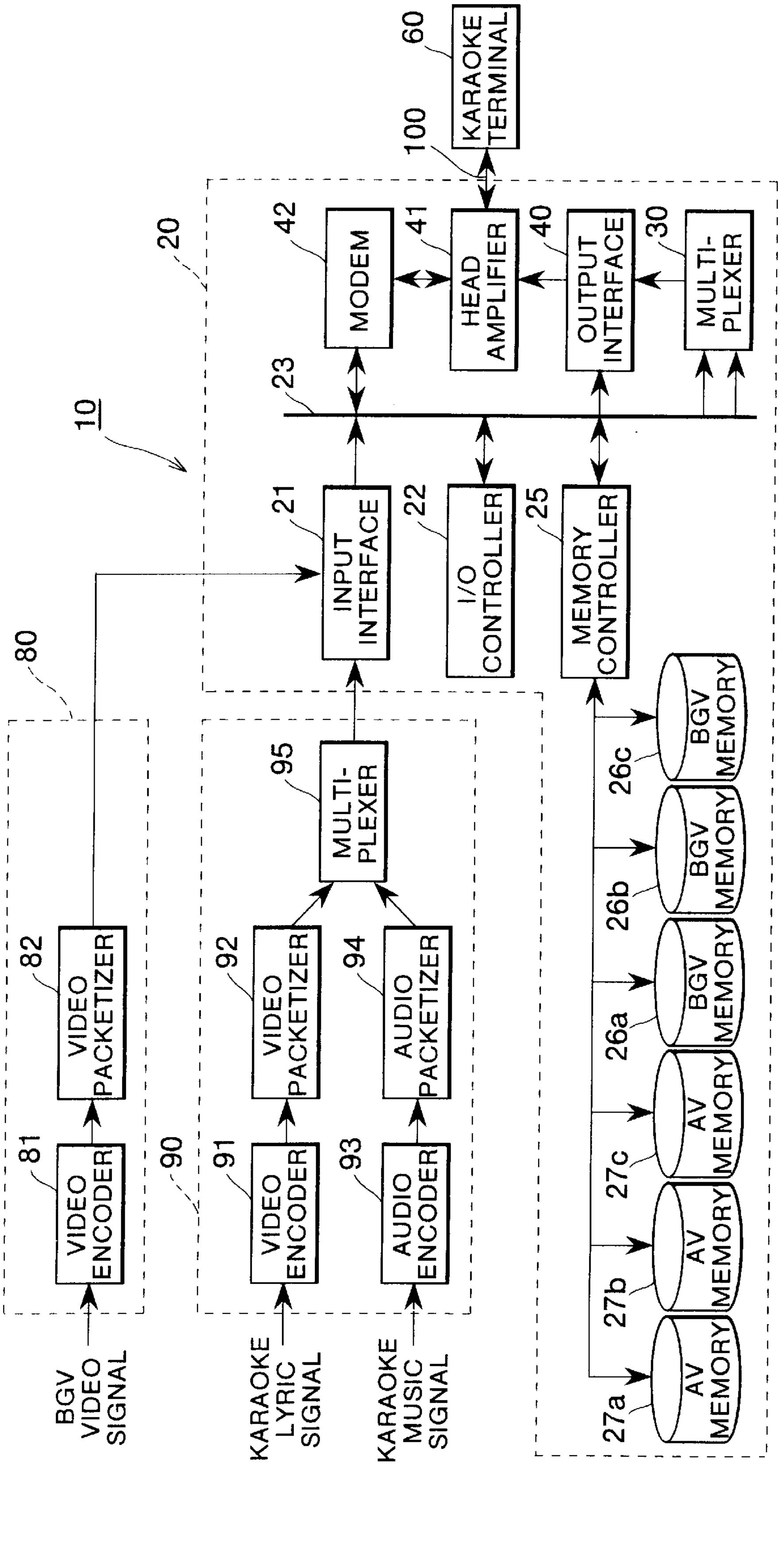
FIG. 1 is a block diagram of a video/audio data supplying system including a video/audio data supplying device of a preferred embodiment of the present invention.

A video/audio data supplying device according to a preferred embodiment of the present invention will be described while referring to the accompanying drawings wherein like parts and components are designated by the same reference numerals to avoid duplicating description.

As shown in FIG. 1, in the video/audio data supplying system 10, a video/audio data output device 60 is connected to a video/audio data supplying device 20 via a communication circuit 100 (coaxial cable). The video/audio data supplying device 20 is for supplying data for karaoke performance to the video/audio data output device 60. The video/audio data output device 60 is for receiving data from the device 20 and for outputting karaoke music sound and karaoke video accordingly. It is noted that a plurality of video/audio data output device 60 may be connected to the single video/audio data supplying device 20.

According to the present embodiment, a set of video data (not text data), indicative of karaoke lyric images, and a set of audio data, indicative of karaoke music, are previously prepared for each of a plurality of songs. For each song, the set of lyric data and the set of music data are composed into a packet data train (AV stream) and stored in the video/audio data supplying device 20.

All the plurality of songs are classified into several genres such as Japanese ballads, popular songs, rock-and-roll songs, and folk songs. A plurality of sets of video data, indicative of karaoke background images, are previously prepared for each genre. The plurality of sets of background video data, thus prepared for each genre, will be used in common to karaoke songs that belong to that genre. Each set of the background data is prepared in the form of a packet data train (BGV stream). All the BGV trains are stored in the video/audio data supplying device 20 separately from the AV streams.

When one karaoke song is requested by a user at the video/audio data output device 60, the video/audio data supplying device 20 will retrieve one AV stream for the user's requested song. The video/audio data supplying device 20 also retrieve one BGV stream of a genre that is appropriate for the user's requested song. The video/audio data supplying device 20 then composes the AV stream and the BGV stream into a composite stream and then transmits the composite stream to the video/audio data output device 60. The video/audio data output device 60 achieves a karaoke performance of the user's selected song with the received composite data.

It is noted that the video/audio data supplying device 20 is detachably mounted with a first data input device 80 and a second data input device 90. The first data input device 80 is for producing a plurality of BGV streams for being stored in the video/audio data supplying device 20. The second data input device 90 is for producing a plurality of AV streams for being stored in the video/audio data supplying device 20.

The first data input device 80 will be described below in greater detail.

The first data input device 80 is for receiving a plurality of BGV video signals representative of background videos for karaoke performances. The first data input device 80 digitizes the BGV video signals into digital signals, encodes the digital signals into BGV data, and converts the BGV data into packet data.

The first data input device 80 will be described below in greater detail.

As shown in FIG. 1, the first data input device 80 includes a video encoder 81 and a video packetizer 82.

Figure 4:
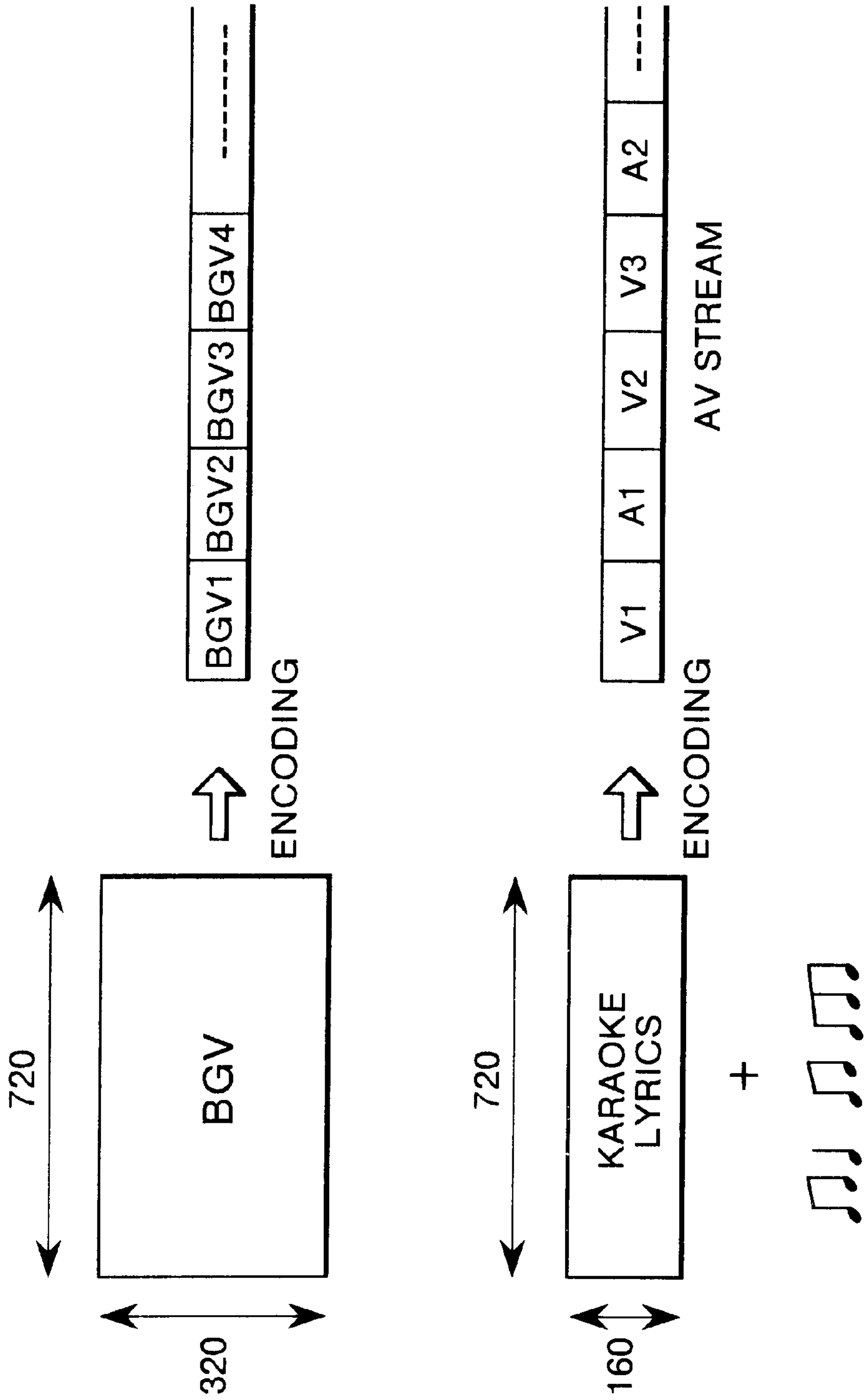
FIG. 4 illustrates a BGV stream and an AV stream stored in the video/audio data supplying device.

The video encoder 81 is for receiving a plurality of analog BGV video signals for each of the several genres. Each BGV video signal is originally edited into a three minute long moving picture because all the karaoke songs are about three minutes long. As shown in FIG. 4, the moving picture has a display size of 720×320 pixels. This size of 720×320 pixels corresponds to an upper two-thirds (⅔) region of an entire frame of a standard MPEG2-formatted image.

When the video encoder 81 receives an analog BGV video signal, the video encoder 81 digitizes the analog BGV video signal into a digital signal, and then encodes the digital signal into a set of BGV data.

The video packetizer 82 is for receiving the set of BGV data. The video packetizer 82 is for converting the BGV data set into a series of background video packet data BGV1, BGV2, BGV3, . . . , as shown in FIG. 4. The video packetizer 82 therefore outputs the background video packet data train BGV1, BGV2, BGV3, . . . as a BGV stream. It is noted that the video packetizer 82 produces the packet data train according to a MPEG2 format. The packet data train BGV1, BGV2, BGV3, . . . will therefore control a monitor television, in the video/audio data output device 60, to display the background moving picture on an upper two-thirds (⅔) region of the entire screen.

It is noted that the original BGV video signal is added with identification number data, before being inputted to the first data input device 80. The identification number data includes an identification number of the corresponding BGV video signal and data indicative of a genre and an image type (scenery image, people image, etc) of the corresponding BGV video signal. Accordingly, the BGV stream, produced as described above, also includes the added identification number data.

The second data input device 90 will be described below in greater detail.

The second data input device 90 is for receiving a plurality of lyric video signals and a plurality of music signals for the plurality of karaoke songs. The second data input device 90 digitizes those signals, encodes those signals, converts those signals into packet data trains, and time-divisionally multiplexes those packet data trains.

As shown in FIG. 1, the second data input device 90 includes a video encoder 91, a video packetizer 92, an audio encoder 93, an audio packetizer 94, and a multiplexer 95.

The video encoder 91 is for receiving the plurality of analog lyric video signals for the plurality of karaoke songs. The audio encoder 93 is for receiving the plurality of analog music signals for the plurality of karaoke songs.

A lyric video signal and a music signal for each song are simultaneously inputted to the video encoder 91 and the audio encoder 93.

As shown in FIG. 4, a lyric video signal is originally edited into a picture where white lyric letters are superimposed on a blue color background having a size of 720×160 pixels. It is noted that this size of 720×160 pixels corresponds to a lower one-third (⅓) region of an entire frame of the standard MPEG2-formatted image.

When the video encoder 91 receives an analog lyric video signal for one karaoke song, the video encoder 91 digitizes the analog signal into a digital lyric video signal. The video encoder 91 further encodes the digital lyric video signal into a set of lyric data.

The video packetizer 92 is for receiving the set of lyric data. When the video packetizer 92 receives the lyric data set, the video packetizer 92 converts the lyric data set into a series of lyric packet data V1, V2, V3, . . . The video packetizer 92 outputs the lyric data train V1, V2, . . . , as a lyric data stream. The video packetizer 92 produces the lyric data train V1, V2, . . . according to the MPEG2 format.

When the video encoder 91 receives the lyric video signal of the song as described above, the audio encoder 93 receives an analog music signal for that song. The audio encoder 93 digitizes the analog music signal into a digital music signal. The audio encoder 93 further encodes the digital signal into a set of music data.

The audio packetizer 94 is for receiving the music data set, and converting the music data set into a series of packet data A1, A2, A3, . . . The audio packetizer 94 outputs the packet data train A1, A2, . . . , as a music data stream. The audio packetizer 94 produces the music data train A1, A2, . . . according to the MPEG2 format.

The multiplexer 95 is for receiving the lyric data stream V1, V2, . . . supplied from the video packetizer 92 and the music data stream A1, A2, . . . supplied from the audio packetizer 94. The multiplexer 95 is for composing the lyric data stream V1, V2, . . . and the music data stream A1, A2, . . . according to the MPEG2 format. The multiplexer 95 therefore outputs an AV (lyric/music) stream consisting of the lyric packet data V1, V2, . . . and the music packet data A1, A2, . . . Accordingly, the multiplexer 95 outputs the lyric packet data V1, V2, . . . and the music packet data A1, A2, . . . alternately as shown in FIG. 4. It is noted that the thus outputted AV stream will control the monitor television, in the video/audio data output device 60, to display the lyric image on a lower one-third (⅓) region of the entire screen.

It is noted that each of the original lyric video signal and the original music signal is added with an identification data, indicative of a corresponding song, before being inputted to the second data input device 90. Accordingly, the AV stream, produced as described above, also includes the added identification data.

Next, the video/audio data supplying device 20 will be described below.

The video/audio data supplying device 20 includes: an input interface 21, an input output controller 22, a memory controller 25, a modem 42, an output interface 40, and a multiplexer 30 which are all connected via a bus line 23 with one another. BGV memories 26*a*, 26*b*, and 26*c*, and AV memories 27*a*, 27*b*, and 27*c* are connected to the memory controller 25. A head amplifier 41 is connected to both the modem 42 and the output interface 40. The head amplifier 41 is connected to the terminal 60 via the communication circuit 100. The input output controller 22 is for controlling the operation of the entire video/audio data supplying device 20.

The input interface 21 is for receiving the BGV stream outputted from the first data input device 80 when the first data input device 80 is connected to the video/audio data supplying device 20. The input interface 21 is also for receiving the AV stream outputted from the second data input device 90 when the second data input device 90 is connected to the video/audio data supplying device 20.

The input output controller 22 is for controlling transfer of the BGV stream from the input interface 21 to the memory controller 25 via the bus line 23. The input output controller 22 is also for controlling transfer of the AV stream from the input interface 21 to the memory controller 25 via the bus line 23.

The memory controller 25 is for storing the BGV stream into a certain region of the BGV memories 26*a*, 26*b*, and 26*c*. The memory controller 25 is also for storing the AV stream into a certain region of the AV memories 27*a*, 27*b*, and 27*c*.

The BGV memories 26*a*, 26*b*, and 26*c* are for storing a plurality of BGV streams for all the genres, which are produced by the first data input device 80 in a manner as described above. The AV memories 27*a*, 27*b*, and 27*c* are for storing a plurality of AV streams for all the karaoke songs which are produced by the second data input device 90 in a manner as described above.

The memory controller 25 is capable of retrieving a desired BGV stream from the BGV memories 26*a*, 26*b*, and 26*c*. The memory controller 25 is also capable of retrieving a desired AV stream from the AV memories 27*a*, 27*b*, and 27*c*.

It is noted that the AV memories 27*a*, 27*b*, and 27*c* store a list, in which the identification data of all the AV streams, stored in the AV memories 27*a*, 27*b*, and 27*c*, are recorded in correspondence with song genres, to which songs for the AV streams belong. The identification numbers of all the BGV streams, stored in the BGV memories 26*a*, 26*b*, and 26*c*, are also recorded in the list in correspondence with the corresponding song genres. This list is renewed when any AV streams or any BGV streams are added to or erased from the memories.

Accordingly, when one song is requested at the video/audio data output device 60, the memory controller 25 will refer to the list. The memory controller 25 will then retrieve an AV stream of the requested song from the AV memories 27*a*, 27*b*, and 27*c*. The memory controller 25 will retrieve, from the BGV memories 26*a*, 26*b*, and 26*c*, a BGV stream of a genre, to which the requested song belongs. The memory controller 25 transfers the thus retrieved pair of AV stream and BGV stream to the multiplexer 30.

The multiplexer 30 is for composing the AV stream and the BGV stream into a single stream as described below.

Figure 2:
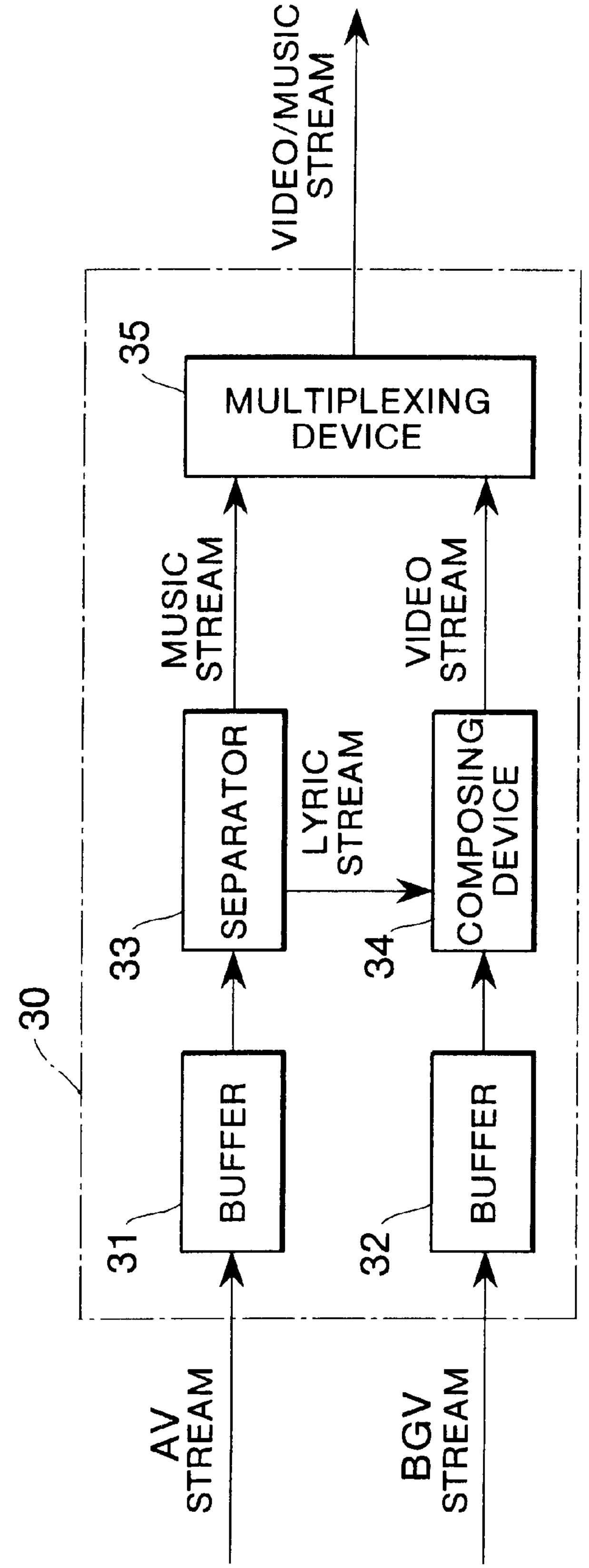
FIG. 2 is a block diagram of a multiplexer employed in the video/audio data supplying device of FIG. 1.

As shown in FIG. 2, the multiplexer 30 includes: a first buffer 31, a second buffer 32; a separating device 33; a composing device 34; and a multiplexing device 35.

The first buffer 31 is a buffer memory for temporarily storing the AV stream transferred from the AV memories 27*a*, 27*b*, and 27*c* before outputting the AV stream to the separating device 33. The second buffer 32 is a buffer memory for temporarily storing the BGV stream transferred from the BGV memories 26*a*, 26*b*, and 26*c* before outputting the BGV stream to the composing device 34.

The separating device 33 is for dividing the AV stream to a music stream and a lyric stream.

Figure 5:
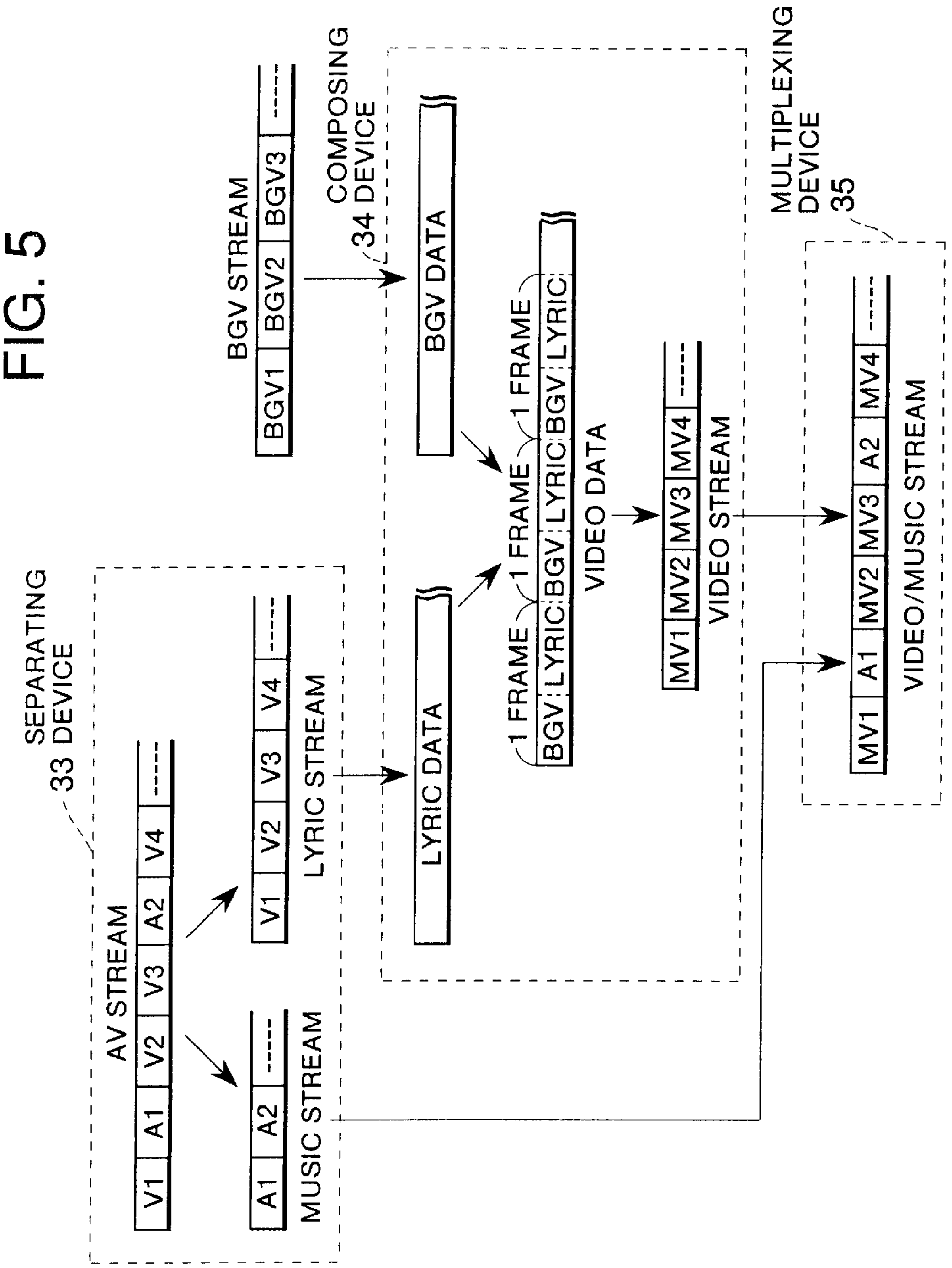
FIG. 5 illustrates how the multiplexer of FIG. 2 processes data.

As shown in FIG. 5, the AV stream has been produced by the multiplexer 95 from the lyric packet data train V1, V2, . . . , and the music packet data train A1, A2, . . . The separating device 33 receives the AV stream and separates the lyric packet data train V1, V2, . . . , from the music packet data train A1, A2, . . . Then, as shown in FIGS. 2 and 5, the separating device 33 outputs the lyric packet data train V1, V2, . . . , to the composing device 34 and the music packet data train A1, A2, . . . to the multiplexing device 35.

As also shown in FIG. 5, the composing device 34 is for receiving the lyric packet data train V1, V2, . . . and for depacketizing the lyric packet data into the set of lyric data. In other words, the composing device 34 reconverts the lyric packet data train back to the set of lyric data. The composing device 34 is also for receiving the BGV stream BGV1, BGV2, . . . from the second buffer 32 and for depacketizing the BGV stream into a set of BGV data. In other words, the composing device 34 reconverts the BGV packet data train back to the set of BGV data. The composing device 34 then composes the lyric data set and the BGV data set into a single set of video data.

Figure 7A:
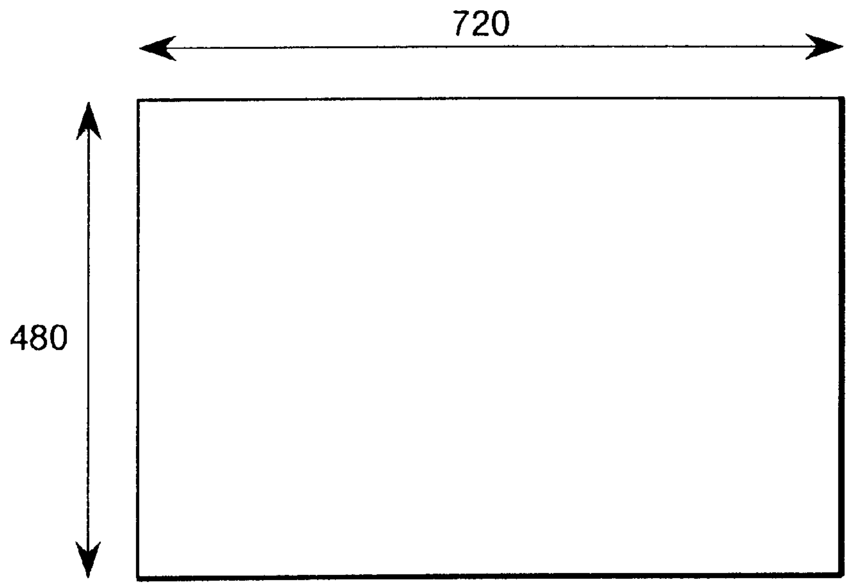
FIG. 7(*a*) illustrates an entire region of a video image displayed at the video/audio data output device.
Figure 7B:
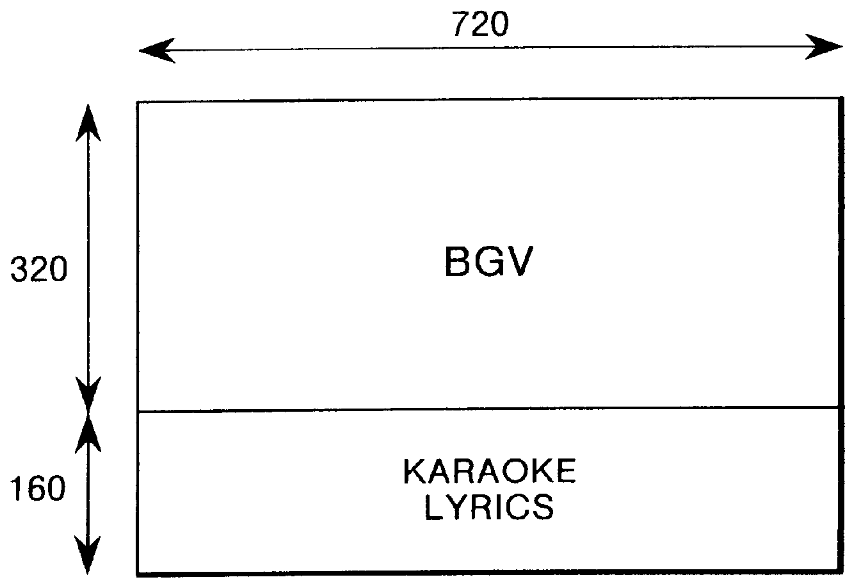

As shown in FIG. 5, the thus composed single video data set includes a successive frames' worth of video data prepared in the MPEG2 standard format. Each frame worth of data includes BGV data and lyric data. As shown in FIG. 7(*b*), the BGV data is indicative of an upper ⅔ region of an entire frame, while the lyric data is indicative of a remaining lower ⅓ region. While the successive frames' worth of video data are displayed, the BGV data and the lyric data will therefore be alternately reproduced. Accordingly, a background image will be displayed in the upper ⅔ frame while a lyric image will be displayed in the lower ⅓ frame.

As shown in FIG. 5, the composing device 34 further converts the single video data set into a video packet data train MV1, MV2, . . . according to the MPEG2 standard. The composing device 34 then outputs the video packet data train as a video stream to the multiplexing device 35.

As also shown in FIG. 5, the multiplexing device 35 is for receiving the video stream MV1, MV2, . . . , outputted from the composing device 34 and for receiving the music stream A1, A2, . . . outputted from the separating device 33. The multiplexing device 35 time-divisionally multiplexes the video stream and the music stream into a video/music stream MV1, A1, MV2, A2, . . . .

Figure 6:
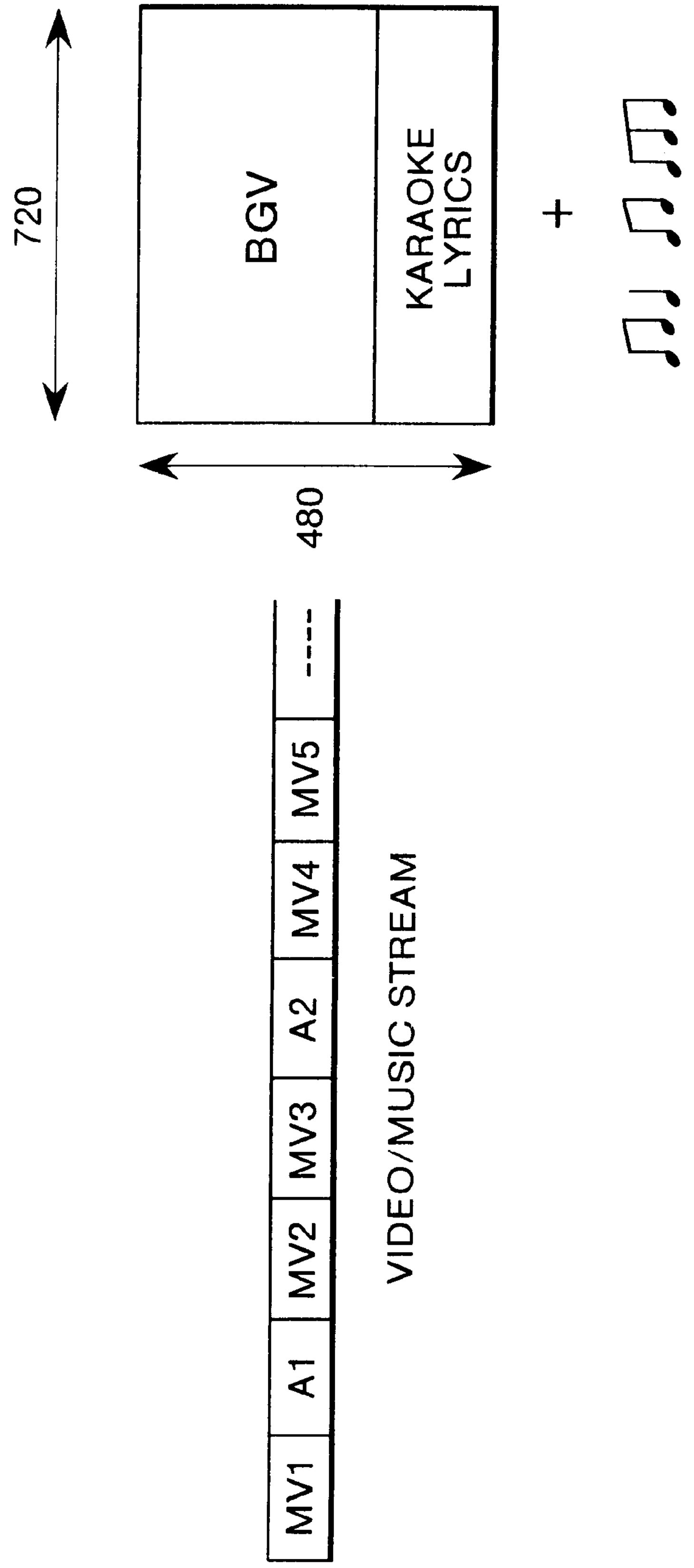
FIG. 6 illustrates a video/music stream outputted from the multiplexer of FIG. 2.

The video/music stream MV1, A1, MV2, A2, . . . will be decoded at the video/audio data output device 60. As a result, as shown in FIG. 6, the video/audio data output device 60 will control a television monitor to display a background image in the upper ⅔ frame region and to display a lyric image in the remaining lower ⅓ frame region. The video/audio data output device 60 will also output a karaoke music in synchronization with the displayed images.

As shown in FIG. 1, the multiplexer 30 supplies the video/music stream to the output interface 40.

As shown in FIG. 1, the output interface 40 is connected to the head amplifier 41. The head amplifier 41 is for receiving the video/music stream MV1, A1, MV2, A2, . . . from the output interface 40 and for modulating the video/music stream into a high frequency signal. The head amplifier 41 outputs the thus modulated high frequency signal through a certain channel in the communication circuit 100.

The head amplifier 41 is further for receiving a signal outputted from the modem 42 and for outputting the signal via a bidirectional communication channel of the communication circuit 100. The head amplifier 41 is further for receiving a signal inputted from the bidirectional communication channel of the communication circuit 100 and for transferring the received signal to the modem 42.

It is noted that the input output controller 22 is further for controlling the modem 42 and the head amplifier 41 to transmit data to and receive data from the video/audio data output device 60 via the communication circuit 100.

Figure 3:
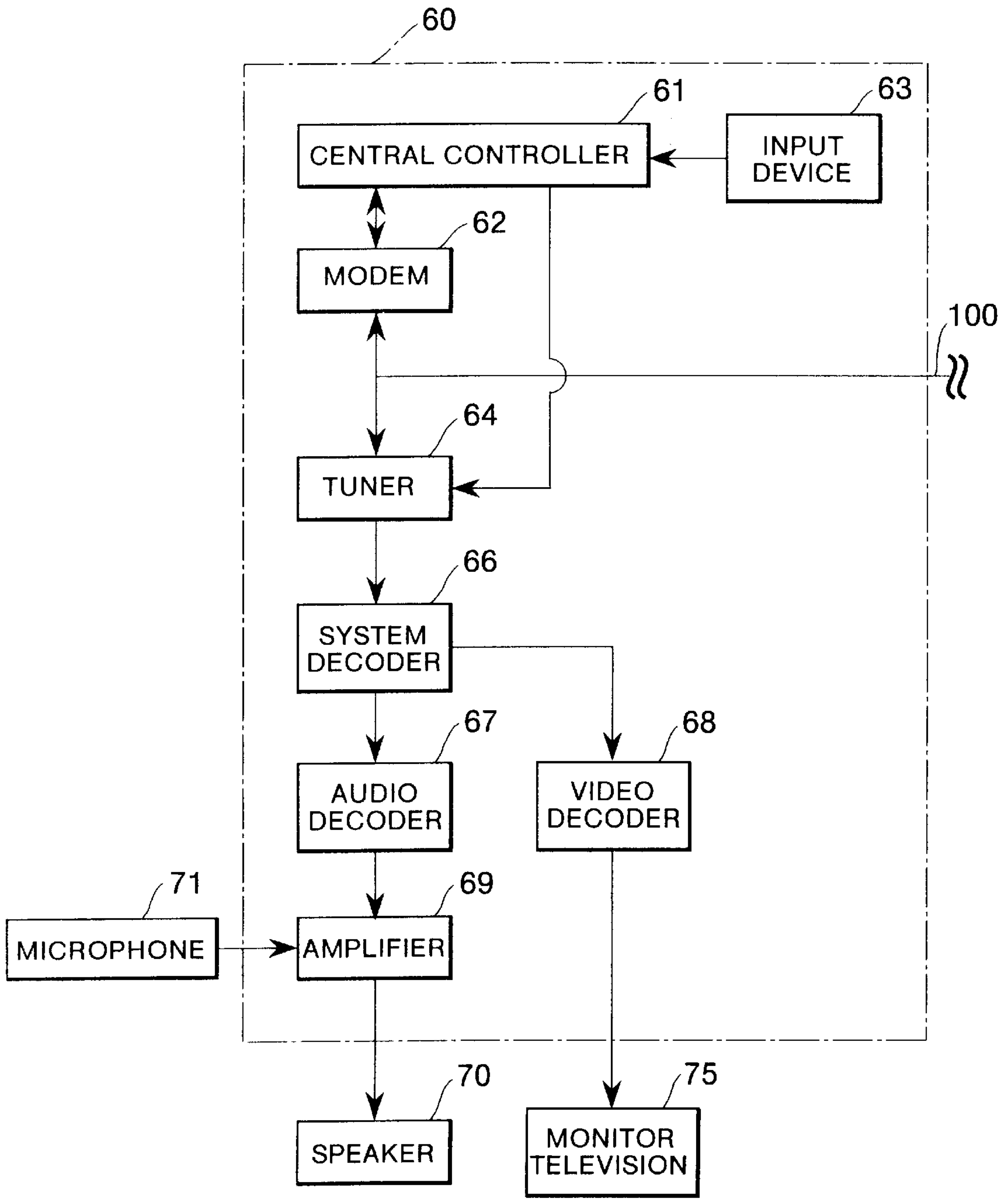
FIG. 3 is a block diagram of a video/audio data output device (terminal) in the system of FIG. 1.

Next, the structure of the video/audio data output device 60 will be described with referring to FIG. 3.

The video/audio data output device 60 includes: a central control portion 61, an input device 63, a modem 62, a tuner 64, a system decoder 66, an audio decoder 67, a video decoder 68, an amplifier 69, a microphone 71, a speaker 70, and a monitor television 75.

The central control portion 61 is for controlling the entire device 60 and is constructed from a microcomputer. The input device 63, connected to the central control portion 61, is comprised of a key board (not shown). A user can manipulate the input device 63 to designate or request his/her desired karaoke song and to instruct other various operations.

The central control portion 61 is connected via the modem 62 to the communication circuit 100. The central control portion 61 can communicate with the video/audio data supplying device 20 via the bidirectional communication channel in the communication circuit 100. With this structure, the central control portion 61 receives request data from the input device 63 and then transmits the request data to the input/output controller 22 in the video/audio data supplying device 20, thereby requesting the video/audio data supplying device 20 to transmit a video/music stream for the requested song to the video/audio data output device 60.

The tuner 64 is also connected to the communication circuit 100. The tuner 64 is for selecting a channel according to an instruction supplied from the central control portion 61, for receiving a video/music stream transmitted via the selected channel, and for transferring the video/music stream to the system decoder 66.

The system decoder 66 is for dividing the video/music stream into a music stream and a video stream. The system decoder 66 outputs the music stream to the audio decoder 67, and outputs the video stream to the video decoder 68.

The audio decoder 67 is for decoding the music stream into a set of digital music data and then for converting the digital music data set into an analog music signal. The audio decoder 67 outputs the analog music signal, as a karaoke music signal, to the amplifier 69.

The amplifier 69 is for receiving the karaoke music signal. The amplifier 69 is connected to the microphone 71 and for receiving the user's voice signal outputted from the microphone 71. The amplifier 69 mixes the user's voice signal with the karaoke music signal outputted from the audio decoder 67, outputs the mixed signal to the speaker 70. The amplifier 69 amplifies the mixed signal and outputs the amplified signal to the speaker 70. The speaker 70 outputs mixed sounds of the user's selected karaoke music and the user's voices.

The video decoder 68 is for decoding the video stream into a digital video data set and for converting the digital video data set into an analog video signal. The video decoder 68 outputs the analog video signal to the monitor television 75. The monitor television 75 displays images based on the analog video signal.

With the above-described structure, the video/audio data supplying system 10 performs operations as described below.

In order to store a plurality of sets of BGV streams for all the genres in the BGV memories 26*a*, 26*b*, and 26*c*, the first data input device 80 is first connected to the video/audio data supplying device 20. Then, a plurality of BGV analog video signals for all the genres are successively inputted to the video encoder 81. The video encoder 81 digitizes the successive analog BGV video signals into digital signals, and then encodes the digital signals into successive sets of BGV data. The video packetizer 82 converts the successive sets of BGV data into successive BGV streams. Each of the thus produced BGV streams includes the added identification number data.

The input interface 21 receives the successive BGV streams from the first data input device 80. The input output controller 22 transfers the BGV streams from the input interface 21 to the memory controller 25 via the bus line 23. The memory controller 25 stores the BGV streams into certain regions of the BGV memories 26*a*, 26*b*, and 26*c*. The identification numbers of the BGV streams are recorded in the list in the AV memories 27*a*, 27*b*, and 27*c* in correspondence with the corresponding genres.

In order to store a plurality of sets of AV streams for all the karaoke songs in the AV memories 27*a*, 27*b*, and 27*c*, the second data input device 90 is connected to the video/audio data supplying device 20. Then, a plurality of lyric analog video signals for all the karaoke songs are inputted to the video encoder 91. A corresponding plurality of analog music signals are inputted to the audio encoder 93.

The video encoder 91 digitizes the successive analog lyric video signals into digital signals, and then encodes the digital signals into successive sets of lyric data. The video packetizer 92 converts the successive sets of lyric data into successive lyric data streams. Simultaneously, the audio encoder 93 digitizes the successive analog music signals into digital signals, and then encodes the digital signals into successive sets of music data. The audio packetizer 94 converts the successive sets of music data into successive music data streams.

The multiplexer 95 composes each lyric data stream with a corresponding music data stream into an AV (lyric/music) stream. Thus, the multiplexer 95 successively produces a plurality of AV streams for all the karaoke songs. It is noted that each of the produced AV stream includes the added identification data indicative of the corresponding song.

The input interface 21 receives the successive AV streams from the second data input device 90. The input output controller 22 transfers the AV streams from the input interface 21 to the memory controller 25 via the bus line 23. The memory controller 25 stores the AV streams into certain regions of the AV memories 27*a*, 27*b*, and 27*c*. The identification data of the AV streams are recorded in the list in the AV memories 27*a*, 27*b*, and 27*c* in correspondence with the corresponding genres.

Thus, the BGV memories 26*a*, 26*b*, and 26*c* store a plurality of BGV streams for all the genres. The AV memories 27*a*, 27*b*, and 27*c* store a plurality of AV streams for all the karaoke songs.

When a user of the video/audio data output device 60 manipulates the input device 63 to request his/her desired karaoke song, the central control portion 61 transmits a video/music stream request to the video/audio data supplying device 20 via the modem 62 and the communication circuit 100.

In the video/audio data supplying device 20, the input output controller 22 receives the request via the modem 42 from the video/audio data output device 60. The input output controller 22 instructs the memory controller 25 to retrieve an AV stream of the requested song from the AV memories 27*a*, 27*b*, and 27*c*. The input output controller 22 further instructs the memory controller 25 to refer to the list and to select a BGV stream that corresponds to a genre to which the requested song belongs. The input output controller 22 further instructs the memory controller 25 to retrieve the selected BGV stream from the BGV memories 26*a*, 26*b*, and 26*c*.

The input output controller 22 instructs the head amplifier 41 to set a channel through which a video/music stream is to be transmitted. The input output controller 22 further informs the requested video/audio data output device 60 of the set channel.

In the video/audio data output device 60, the central control portion 61 controls the tuner 64 to select the informed channel. Then, the video/audio data output device 60 waits for the video/music stream to be transmitted from the video/audio data supplying device 20.

Next, the memory controller 25 in the video/audio data supplying device 20 retrieves the BGV stream from the BGV memories 26*a*, 26*b*, and 26*c*, and transfers the BGV stream to the multiplexer 30. The memory controller 25 further retrieves the AV stream from the AV memories 27*a*, 27*b*, and 27*c*, and transfers the AV stream to the multiplexer 30.

The multiplexer 30 temporarily divides the AV stream into a music stream and a lyric stream before composing the lyric stream and the BGV stream into a video stream. The multiplexer 30 further time-divisionally multiplexes the video stream and the music stream into a vide/music stream. The multiplexer 30 outputs the video/music stream to the head amplifier 41 via the output interface 40. The video/music stream is transmitted through the communication circuit 100 via the channel set by the input output controller 22.

In the video/audio data output device 60, the tuner 64 receives the video/music stream, and transfers the video/music stream to the system decoder 66. The system decoder 66 divides the video/music stream into a video stream and a music stream. The system decoder 66 outputs the music stream to the audio decoder 67, and outputs the video stream to the video decoder 68.

The video decoder 68 decodes the video stream into a set of digital video data and converts the digital video data set into an analog video signal. The video decoder 68 outputs the video signal to the monitor television 75. The monitor television 75 displays an image based on the received video signal. As a result, in the monitor television 75, a background image is displayed in an upper ⅔ region of the television screen and a lyric image is displayed in a remaining lower ⅓ region of the screen.

The audio decoder 67 decodes the music stream into a set of digital music data, and converts the digital music data set into an analog music signal. The audio decoder 67 supplies the analog music signal, as a karaoke music signal, to the amplifier 69.

The user sings his/her selected karaoke song on the microphone 71 while observing the lyrics displayed on the monitor television 75 which are superimposed on the background image. The amplifier 69 mixes the analog music signal with the user's voice signal outputted from the microphone 71. The amplifier 69 then amplifies the mixed signal and outputs the mixed signal to the speaker 70. The speaker 70 outputs a mixed sound of the karaoke music and the user's voices.

Thus, according to the present embodiment, when the input output controller 22 receives request data through the modem 42, the input output controller 22 controls the memory controller 25 to retrieve an AV stream and a BGV stream from the memories and to transfer the retrieved streams to the multiplexer 30. When receiving the BGV stream and the AV stream, the multiplexer 30 divides the AV stream into a lyric stream and a music stream. The multiplexer 30 composes the lyric stream and the BGV stream into a video stream. The multiplexer 30 time-divisionally multiplexes the video stream and the music stream and outputs the multiplexed stream as a video/music stream.

As described above, in the video/audio data supplying device 20, a plurality of AV streams, for karaoke lyric images and karaoke music, are stored separately from a plurality of BGV streams, for background images. When a karaoke song is requested, one AV stream for the requested song is retrieved. One BGV stream for a genre, to which the requested song belongs, is also retrieved. The AV stream and the BGV stream are composed into a video/music stream by the multiplexer 30. The video/music stream is supplied to the video/audio data output device 60.

Accordingly, each BGV stream can be used for a plurality of karaoke songs that belong to a corresponding genre. In other words, each BGV stream can be combined with a plurality of AV streams that belong to the corresponding genre. It is sufficient to store a small number of BGV data. Accordingly, the video/audio data supplying device 20 becomes inexpensive.

While the invention has been described in detail with reference to the specific embodiment thereof, it would be apparent to those skilled in the art that various changes and modifications may be made therein without departing from the spirit of the invention.

For example, the video/audio data supplying device of the present invention is not limited to the karaoke data supplying system.

In the above description, the AV streams and the BGV streams are prepared in the MPEG2 packet data trains. When an AV stream and a BGV stream are combined into one video/music stream, the video/music stream is produced according to the MPEG2 standard. However, those data streams can be converted into other types of packet data trains. Those data streams may not be converted into packet data trains.

Communication between the video/audio data supplying device 20 and the output terminal 60 may not be performed through the coaxial cable. The communication may be achieved through other various kinds of transmission paths such as a radio transmission path. The communication can be performed through not only the electromagnetic method but also an optical method.

What is claimed is:

1. A video/audio data supplying device for supplying video data and audio data, the device comprising:

data memory means for storing video/audio data, comprised of video data and audio data, and additional video data separately from the video/audio data;

data retrieving means for retrieving the video/audio data and the additional video data from the data memory means;

data composing means for composing the retrieved video/audio data and the additional data into a single composite video/audio data; and output means for supplying the composite video/audio data to an output terminal.

2. A video/audio data supplying device as claimed in claim 1, wherein the video/audio data is comprised of lyric video data and music data for a karaoke song.

3. A video/audio data supplying device as claimed in claim 2, wherein the memory means stores a plurality of sets of video/audio data for a plurality of karaoke songs.

4. A video/audio data supplying device as claimed in claim 3, further comprising control means for controlling the retrieving means to select a set of video/audio data for a desired karaoke song.

5. A video/audio data supplying device as claimed in claim 3, wherein the memory means further stores a plurality of sets of additional video data for each of several genres, to which the plurality of karaoke songs are classified, each set of additional video data being comprised of background video data for a corresponding genre.

6. A video/audio data supplying device as claimed in claim 5, further comprising control means for controlling the retrieving means to select a set of video/audio data for a desired karaoke song and to select a set of additional video data of a genre to which a desired karaoke song belongs, the data composing means composing the selected video/audio data and the selected additional video data into a single composite video/audio data.

7. A video/audio data supplying device as claimed in claim 6, wherein the control means receives a request, from the output terminal, to transmit data of a desired karaoke song, the control means controlling the retrieving means to select a set of video/audio data for the requested karaoke song and to select a set of additional video data of a genre to which the requested karaoke song belongs.

8. A video/audio data supplying device as claimed in claim 2, wherein the additional video data is comprised of background video data for a karaoke performance.

9. A video/audio data supplying device as claimed in claim 1, wherein the additional video data is comprised of video data to be combined with the video data in the video/audio data.

10. A video/audio data supplying device as claimed in claim 9, wherein the memory means stores a plurality of sets of video/audio data and a plurality of sets of additional video data for several genres, to which the plurality of sets of video/audio data are classified, each set of additional video data of each genre being comprised of video data to be combined with video/audio data of the genre.

11. A video/audio data supplying device as claimed in claim 10, further comprising control means for controlling the retrieving means to select a desired set of video/audio data and to select a set of additional video data of a genre to which a desired video/audio data set belongs, the data composing means composing the selected video/audio data and the selected additional video data into a single composite video/audio data.

12. A video/audio data supplying device as claimed in claim 11, wherein the control means receives a request, from the output terminal, to transmit a desired composite video/audio data, the control means controlling the retrieving means to select a set of video/audio data for the requested data and to select a set of additional video data of a genre to which the requested data belongs.

13. A video/audio data supplying device as claimed in claim 1, wherein the data memory means stores, as the video/audio data, a video/audio composite stream that is comprised of a combination of a video packet data train and an audio packet data train, the data memory means further storing, as the additional video data, an additional video stream that is comprised of an additional video packet data train.

14. A video/audio data supplying device as claimed in claim 13, wherein the data composing means includes:

separating means for separating the video/audio stream into the video packet data train and the audio packet data train;

depacketizing means for receiving the video packet data train and for depacketizing the video packet data train into a set of video data, the depacketizing means receiving the additional video stream and for depacketizing the additional video stream into a set of additional video data;

composing means for composing the set of video data and the set of additional video data into a single set of composite video data;

packetizing means for packetizing the single set of composite video data into a composite video packet data train; and multiplexing means for multiplexing the composite video packet data train with the audio packet data train into a single composite video/audio stream as the single composite video/audio data.

15. A video/audio data supplying device as claimed in claim 14, further comprising:

data input means for inputting the video/audio composite stream into the data memory means, the data input means including:

a video encoder receiving a set of analog video signals, digitizing the set of analog video signals into a set of digital video signals, and encoding the set of digital video data;

a video packetizer receiving the set of digital video data and converting the set of digital video data into the video packet data train;

an audio encoder receiving a set of analog audio signals, digitizing the set of analog audio signals into a set of digital audio signals, and encoding the set of digital audio signals into a set of digital audio data;

an audio packetizer receiving the set of digital audio data and converting the set of digital audio data into the audio packet data train; and a multiplexer receiving the video packet data train and the audio packet data train, and composing the video packet data train and the audio packet data train into the video/audio composite stream; and additional data input means for inputting the additional video stream into the data memory means, the additional data input means including:

a video encoder receiving a set of analog additional video signals, digitizing the set of analog video signals into a set of digital additional video signals, and encoding the set of digital additional video signals into a set of digital additional video data; and a video packetizer receiving the set of digital additional video data and converting the set of digital additional video data into the additional video packet data train as the additional video stream.

16. A video/audio data supplying device as claimed in claim 15, wherein the data input means and the additional data input means are detachably mounted with the video/audio data supplying device.

17. A video/audio data supplying device for supplying video and audio data, the device comprising:

data memory means for storing a video/audio stream and an additional video stream separately from each other, the video/audio stream being comprised of the combination of a video packet data train and an audio packet data train, the additional video stream including an additional video packet data train;

data retrieving means for retrieving the video/audio stream and the additional video stream from the data memory means;

data composing means for composing the retrieved video/audio stream and the additional video stream into a single composite video/audio stream; and supply means for supplying the composite video/audio stream to an output terminal.

* * * * *